J. B. Ghormley,
Cattle Pump,
No. 38,578. Patented May 19, 1863.
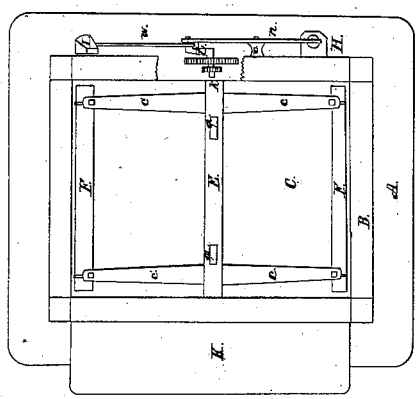
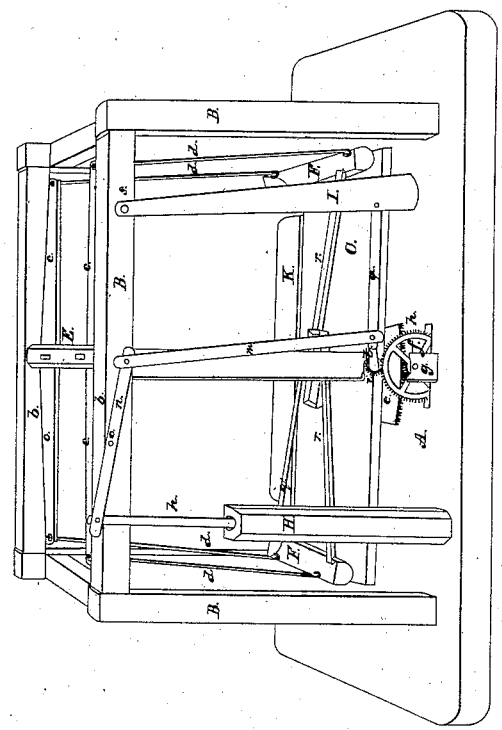
Attest:
D. L. Reid
D. W. Crolley
Inventor:
John B Ghormley
By Wm Clough
Atty

UNITED STATES PATENT OFFICE.

JOHN B. GHORMLEY, OF BELLEFONTAINE, OHIO.

IMPROVEMENT IN CATTLE-PUMPS.

Specification forming part of Letters Patent No. 38,578, dated May 19, 1863.

*To all whom it may concern:*

Be it known that I, JOHN B. GHORMLEY, of Bellefontaine, in the county of Logan and State of Ohio, have invented a new and Improved Device for Supplying Stock-Troughs with Water; and I do hereby declare the following to be a full, clear, and exact description thereof, reference being had to the accompanying drawings, and letters of reference marked thereon, making a part of this specification.

My invention consists in the combination and arrangement of the various parts hereinafter described for raising the water by the vibration of the platform upon which the watering-troughs are placed, which platform is occupied and traversed by the stock while drinking or seeking water, thereby causing the vibrations above mentioned.

In the accompanying drawings, Figure 1 is a perspective view of the machine or apparatus. Fig. 2 is a top view of the same.

Like letters of reference indicate like parts in the two drawings.

A is the foundation, consisting of a suitable frame-work for supporting the apparatus.

B is a rectangular frame, having cornerposts and top plates, as represented, the whole constructed and joined in a substantial manner.

C is a vibrating platform, supported by pendulum-arms $a$ $a$ descending from a horizontal beam, E, which is journaled in the horizontal top plates, $b$ $b$.

$c$ $c$ $c'$ $c'$ are horizontal arms, carried by beam E, and from the extremities of these arms rods $d$ $d$ $d'$ $d'$ descend and support troughs F F', one at either end of vibrating platform C.

$e$ is a toothed segment, secured to the under side of vibrating platform C. It is in gear with pinion $f$ on shaft $g$, which shaft carries a large wheel, $h$, which gives motion to a small wheel, $i$, on crank-shaft $k$.

$t$ is a crank on the end of shaft $k$.

$m$ is a pitman connecting crank $t$ with one end of bar $n$, which vibrates on a pin, $o$, the opposite end of bar $n$ being attached to pump-rod $p$ of pump H.

$q$ is a pipe leading from pump H to a point midway between troughs F F', where it discharges, either into spout $r$ leading to trough F, or into spout $r'$ leading into trough F', or alternately as platform C is vibrated from side to side, as will more plainly appear hereinafter.

I is a pendulum-piece, suspended at $s$, and made quite heavy at its lower end. It is connected with crank $t$ by a bar, $u$, so as to vibrate simultaneously with the rotation of crank, for a purpose which will be described.

K is a platform leading from the ground to platform C, affording to the stock convenient access to the latter.

I will now describe the operation of my invention, which as follows: The weight of one or more herds of cattle on platform C, and in the vicinity of either the troughs F or F', causes the platform to vibrate through a short arc around its axis in the beam E. The toothed segment $e$ in gear with pinion $f$, imparts motion through it, and the system of gearing, which has been described, to the crank $t$, the latter operating through pitman $m$ and vibrating bar $n$, opposite the pump-rod $p$ of pump H. The water elevated by the pump is conducted through spout or pipe $q$ to one of the two spouts $r$ or $r'$, to be conducted thereby to one of the troughs F or F'. But observe that the arrangement of the pipe $q$ and spouts $r$ $r'$ is such relatively to the vibrating platform C that when the latter is vibrated by the weight of stock depressing one edge thereof, the position of the parts above named is such that the water from pipe $q$ flows into that spout which leads to the trough opposite to that which is depressed by the presence and weight of stock, so that while the stock are seeking water and drinking at one trough the pump is being operated by their weight to replenish the trough on the opposite side of platform. When water becomes exhausted in one trough, the stock naturally cross the platform to the opposite side, thereby vibrating the platform in the opposite direction, and operating the pump to replenish the trough on the side which has just been deserted. This in turn is afterward visited, the weight of the cattle vibrating the platform in the direction first described, and again supplying water to the trough last deserted. In this manner the natural habit of stock, particularly of neat cattle, to roam from one pool to another, even when that from which they may be drinking is not exhausted, is made available in raising water for their own use. The weighted pendulum-piece I, when the platform C is abandoned, finds a vertical position by its own gravity, and this coincides with and restores the platform C to a true horizontal position, so that the latter, when at rest, and when approached by stock seeking water, is always found in a horizontal or level position.

I am aware that platforms have been so arranged as to be depressed by the weight of cattle or other stock, and the movement of the platform thus depressed employed to elevate water. This I do not claim; but

What I claim as my invention, and desire to secure by Letters Patent, is—

The combination and arrangement of the vibrating or swinging platform C, troughs F F', pump H, pipe or spout $q$, and conducting-spouts $r$ $r'$, substantially as herein described, and for the purpose specified.

JOHN B. GHORMLEY.

Witnesses:
 JOHN SINGER,
 JAMES CASSIL.